(12) United States Patent
Shigehiro et al.

(10) Patent No.: US 6,800,368 B2
(45) Date of Patent: Oct. 5, 2004

(54) IMAGE DISPLAY MEDIUM

(75) Inventors: Kiyoshi Shigehiro, Nakai-machi (JP);
Yoshinori Machida, Nakai-machi (JP);
Takeshi Matsunaga, Nakai-machi (JP);
Yoshiro Yamaguchi, Nakai-machi (JP);
Motohiko Sakamaki, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 357 days.

(21) Appl. No.: 09/879,003

(22) Filed: Jun. 13, 2001

(65) Prior Publication Data
US 2002/0044333 A1 Apr. 18, 2002

(30) Foreign Application Priority Data
Aug. 31, 2000 (JP) ...................................... 2000-263953

(51) Int. Cl.$^7$ .............................................. B32B 15/02
(52) U.S. Cl. ...................... 428/403; 428/34; 428/323; 428/402; 428/404; 428/405; 428/327
(58) Field of Search .................. 428/34, 323, 327–331, 428/402, 403–407

(56) References Cited
U.S. PATENT DOCUMENTS 4,980,257 A * 12/1990 Anno et al. .............. 430/110.2
6,400,492 B1 * 6/2002 Morita et al. ................ 359/296
6,405,007 B1 * 6/2002 Aita et al. .................... 399/174
6,407,763 B1 * 6/2002 Yamaguchi et al. ......... 347/112
6,517,618 B2 * 2/2003 Foucher et al. .......... 106/31.16

FOREIGN PATENT DOCUMENTS
JP        10-3177 A       1/1998

OTHER PUBLICATIONS

Gugrae–Jo et al. "New Toner Display Device (1)", Japan Hardcopy'99, pp. 249–252.

* cited by examiner

Primary Examiner—Deborah Jones
Assistant Examiner—G. Blackwell-Rudaill
(74) Attorney, Agent, or Firm—Oliff & Berridge, PLC

(57) ABSTRACT

An image display medium is provided that does not easily cause image unevenness and maintains high contrast even after repeated use for a long period of time. The image display medium contains a first substrate transmitting light, a second substrate provided to face the first substrate, first and second particles having different colors filled between the first substrate and the second substrate, the first and second particles each contain mother particles and fine particles attached on a surface of the mother particles, the first particles are charged positively, and the second particles are charged negatively.

12 Claims, 4 Drawing Sheets

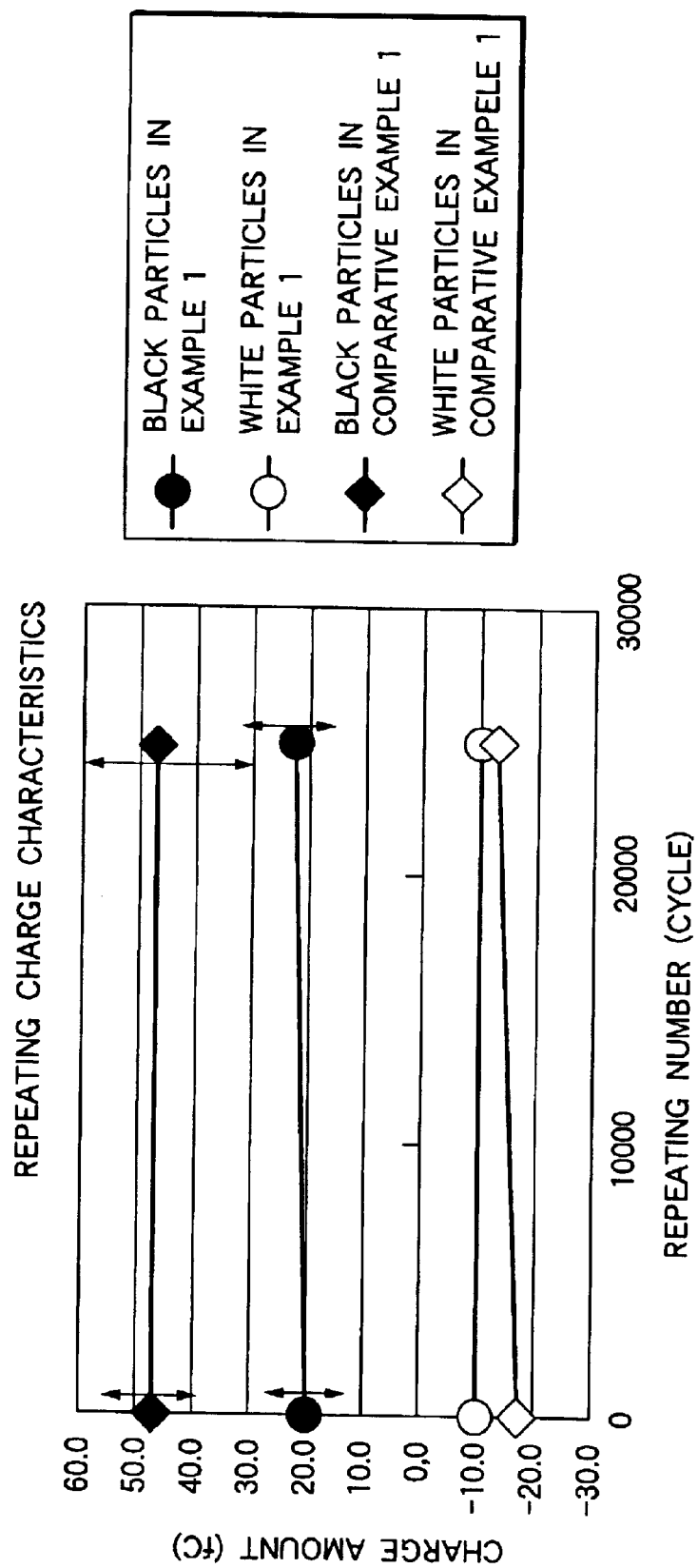

IMAGE DISPLAY MEDIUM

FIELD OF THE INVENTION

The present invention relates to an image display medium, and more particularly, it relates to an image display medium using particles.

BACKGROUND OF THE INVENTION

As an image display medium that can be repeatedly rewritten, a twisting ball display (utilizing rotatable particles coated with two colors), a medium utilizing electrophoresis or magnetophoresis, a thermal rewritable medium and a medium utilizing a liquid crystal that can store an image have been proposed. These image display media are excellent in storage stability of an image but have low contrast due to low whiteness of the background.

As an image display medium having a white background, a medium has been proposed, in which an electroconductive colored toner and white particles are filled between a pair of electrodes facing each other. In this image display medium, an electric charge is injected to the electroconductive colored toner through a charge transporting layer formed on the inner surface of the electrode of the non-display substrate, and the electroconductive colored toner having the electric charge injected migrates to the display substrate facing the non-display substrate by an electric field between the electrode substrates, whereby the electroconductive colored toner adheres on the inner surface of the display substrate to display an image (Theses from Japan Hardcopy, 1999, p. 249–252). This image display medium is formed only with solid materials, and white color display and black color display can be theoretically completely switched. In the image display medium, however, an electroconductive colored toner that is not in contact with the charge transporting layer provided on the inner surface of the electrode of the non-image display substrate and an electroconductive colored toner that is isolated from the other electroconductive colored toner are present, and these kinds of electroconductive colored toner do not migrate by the electric field but are present at random between the substrate because no electric charge is injected thereinto, and therefore improvement in contrast is insufficient.

The inventors have been proposed an image display medium containing a pair of substrates having filled therebetween plural kinds of particles having different colors and different charge characteristics (Japanese Patent Application No. 2000-165138). The image display medium can exhibit excellent contrast in the initial stage, but after subjecting rewriting for a long period of time, there are case where the image density is decreased to lower the contrast, and the image density becomes non-uniform to cause image unevenness.

SUMMARY OF THE INVENTION

The invention has been made in view of the foregoing circumstances and is to provide an image display medium that can display an image without image unevenness having high contrast even when the medium is repeatedly rewritten for a long period of time.

According to an aspect of the invention, the image display medium contains a first substrate transmitting light, a second substrate provided to face the first substrate, first and second particles having different colors filled between the first substrate and the second substrate, the first and second particles each contain mother particles and fine particles attached on a surface of the mother particles, the first particles are charged positively, and the second particles are charged negatively.

The first particles and the second particles collide with the particles, the substrates and a vessel due to agitation before filling and agitation in the initialization step after filling, and as a result, the first particles are charged positively, whereas the second particles are charged negatively. Thus, a Coulomb force is formed between the first particles and the second particles, and the first particles and the second particles intend to be attached and aggregated to each other. Upon application of an electric field to the substrates corresponding to an image signal, when an electrostatic force applied to the respective particles caused by the applied electric field is larger than the coulomb force between the first and second particles, and the image force and a contact potential force between the particles and the substrates, the first and second particles are separated from each other to migrate to the substrate having the polarity opposite to the polarity of the particles. The charged particles reaching the substrate are attached to and fixed on the substrate by an image force formed between the particles and the substrate and a van der Waals force between the particles and the substrate.

When the charge amounts of the respective particles are high, the aggregation force between the first and second particles is high, and thus the particles are difficult to be separated. Further, the particles having a large charge amount have a high adhesion property and are difficult to migrate even when an electric field is applied thereto, and the probability that the particles are fixed on the surface of the substrate becomes high. When aggregated particles having a high charge amount are separated, there is a possibility that electric discharge is locally caused, and the resulting charge amounts cannot be constant.

When the particles have a low charge amount, on the other hand, the respective particles are difficult to be affected by the external electric field, and the particles do not migrate but maintain a loosely aggregated state.

According to the invention, the first and second particles maintain suitable charge amounts for the respective particles owing to the presence of the fine particles on the surface of the mother particles. Therefore, the first and second particles are quickly separated by application of an electric field corresponding to an image signal to the substrates, and a desired image formed by contrast between the color of the first particles and the color of the second particles. The resulting image is maintained after turning off the electric field because the particles moving to the substrates stay thereon owing to the image force and a van der Waals force.

It is preferred that the mother particles of the first particles are those charged positively, and the mother particles of the second particles are those charged negatively. The fine particles of the first particles are preferably those charged positively, and specifically, fine particles treated with a silane coupling agent containing a nitrogen atom or a silicone oil containing a nitrogen atom are preferred. The fine particles of the second particles are preferably those charged negatively, and specifically, fine particles treated with a silane coupling agent containing atoms other than a nitrogen atom or a silicone oil containing atoms other than a nitrogen atom. The fine particles impart an appropriate charge amount, stable charge maintenance characteristics and a good fluidity to the particles, and they enable that the particles can repeatedly migrate between the substrates by the electric field applied between the substrates without firmly adhering on the inner surfaces of the substrates.

The first and/or second particles may further contain electroconductive fine particles. When the electroconductive fine particles that adequately cause exchange of the charge and leakage of the charge are present in combination with the fine particles, increase of the charge amount of the particles due to friction among the particles and friction between the particles and the substrates for a long period, i.e., so-called charge-up, can be avoided.

The fine particles are preferably firmly fixed on the surface of the mother particles by a heating treatment or a high speed airflow impact treatment. According to the treatment, even when collision among the particles and between the particles and the substrates repeatedly occurs due to the repeated migration of the particles to cause mechanical impact and frictional heat applied on the particles, the particles are prevented from detachment and flotage of the fine particles attached on the surface of the mother particles, attachment of the floating fine particles on the surface of the other particles, and burying on the surface of the particles, whereby fluctuation of the charge characteristics and the flowability in the initial stage is prevented.

BRIEF DESCRIPTION OF THE DRAWINGS

Preferred embodiments of the invention will be described in detail with reference to the following figures, wherein:

FIG. 7 is a graph showing the relationship between the repeating number of switching of voltage and the charge amount distribution.

DESCRIPTION OF THE PREFERRED EMBODIMENTS

The invention will be described in detail with reference to preferred embodiments.

Figure 1:
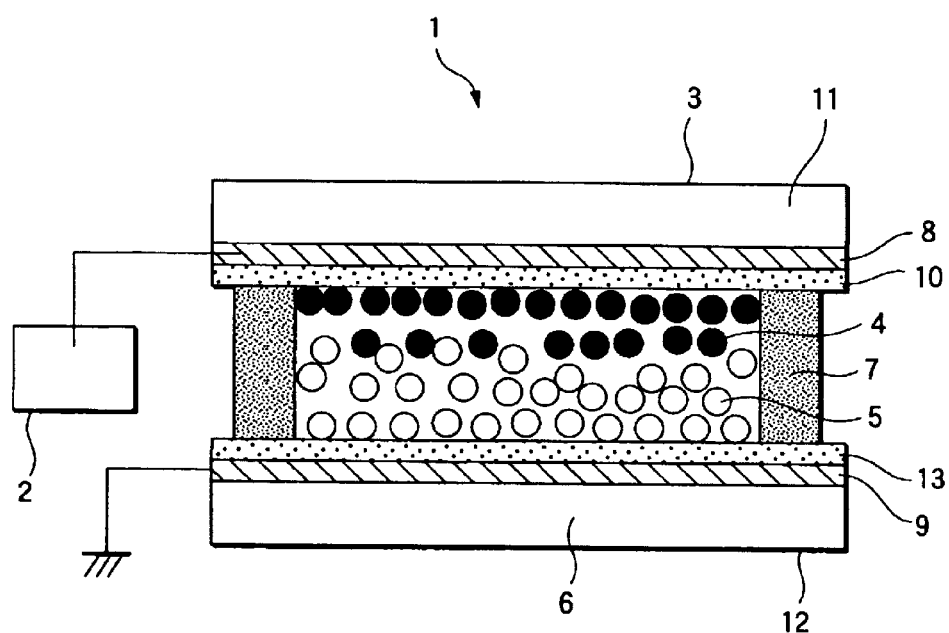
FIG. 1 is a schematic diagram showing a constitution of an image display medium according to the invention.

FIG. 1 is a schematic diagram of an image display medium 1 according to the embodiment. The image recording medium 1 contains a first substrate 3, a second substrate 6, a spacer 7 arranged on the outer peripheries of the substrates, and first particles 4 and second particles 5 having different colors filled in a space formed by the spacer 7 between the first substrate 3 and the second substrate 6. The first substrate 3 can transmit light and can be constituted with a support base 11, an electrode 8 and a dielectric film 10 each having such nature. The second substrate 6 can be constituted with a support base 12, an electrode 9 and a dielectric film 13, but they may not have light transmittance. The electrode 8 of the first substrate 3 is connected, for example, to a voltage applying unit 2, and the electrode 9 of the second substrate 6 is grounded.

Examples of the support base include glass and plastics, such as a polycarbonate resin, an acrylic resin, a polyimide resin and a polyester resin. Examples of the electrode include an oxide, such as ITO and oxides of indium, tin, cadmium and antimony, a complex oxide thereof, a metal, such as gold, silver, copper and nickel, and an organic electroconductive material, such as polypyrrole and polythiophene. Examples of the dielectric film include polycarbonate, polyester, polyimide, epoxy resin, polyisocyanate, polyamide, polyvinyl alcohol, polybutadiene, polymethyl methacrylate, copolymer nylon, an ultraviolet ray curing acrylic resin and amorphous Tetra fluoro ethylene. The dielectric film is appropriately selected depending on the composition of the particles since it may affect the charge characteristics and the fluidity of the first and second particles. Since the first substrate necessarily transmits light, those materials that are transparent are preferably used.

The spacer is formed with an electrically insulating material, and specific examples thereof include a thermoplastic resin, a thermosetting resin, an ultraviolet ray curing resin and rubber.

The first and second particles each are formed with mother particles and fine particles attached on the surface of the mother particles.

The mother particles contain a colorant. As the colorant, an organic or inorganic pigment and an oil soluble dye can be used, and examples thereof include magnetic powder, such as magnetite and ferrite, and known colorants, such as carbon black, titanium oxide, magnesium oxide, zinc oxide, a copper phthalocyanine series cyan colorant, an azo series yellow colorant, an azo series magenta colorant, a quinacridone series magenta colorant, a red colorant, a green colorant and a blue colorant. Specific and representative examples thereof include Aniline Blue, Calco Oil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Blue 15:1 and C.I. Pigment Blue 15:3. Colorants having different color tones are used in the first and second particles.

The mother particles may contain a binder resin, whereby the fine particles are readily attached on the surface thereof. Examples of the binder resin include a thermoplastic resin and, in addition thereto, a thermosetting resin. Examples of the thermoplastic resin include a homopolymer and a copolymer of a styrene compound, such as styrene and chlorostyrene, a monoolefin, such as ethylene, propylene, butylene and isoprene, a vinyl ester, such as vinyl acetate, vinyl propionate, vinyl banzoate and vinyl butyrate, an α-methylene aliphatic monocarboxylate, such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate, a vinyl ether, such as vinyl methyl ether, vinyl ethyl ether and vinyl butyl ether, and a vinyl ketone, such as vinyl methyl ketone, vinyl hexyl ketone and vinyl isopropenyl ketone. Examples of the thermosetting resin include a phenol resin, a urea resin, a melamine resin, a polyester resin and a silicone resin. Particularly representative examples of the binder resin include polystyrene, a styrene-alkyl acrylate copolymer, a styrene-butadiene copolymer, a styrene-maleic anhydride copolymer, polyethylene, polypropylene, polyester, polyurethane, an epoxy resin, a silicone resin, polyamide, modified rosin and paraffin wax.

The shape of the mother particles is not particularly limited, and when it is a true sphere, the particles are in contact with each other by point contact, and the particles and the inner surface of the substrate are in contact with each other by point contact, whereby the adhering force between the particles and the inner surface of the substrate based on a van der Walls force is small. Therefore, it is considered that even when the dielectric film is present inside the substrate, the charged particles can readily and smoothly migrate between the substrate by the electric field. In order to form spherical particles, suspension polymerization, emulsion polymerization and dispersion polymerization can be employed.

Primary particles of the mother particles generally have a particle diameter of from 1 to 1,000 μm, and preferably from 5 to 50 μm, but the invention is not limited thereto. In order to obtain high contrast, it is preferred that the particle diameters of the mother particles of the first particles and the mother particles of the second particles are substantially the same as each other. According to the procedure, such a disadvantageous phenomenon can be avoided that large particles are surrounded by small particles to decrease the inherent color density of the large particles.

The mother particles can be formed only with an inorganic pigment (such as carbon black) itself and thus do not necessarily have charging property. When mother particles having charging property are used, it is preferred that mother particles charged positively are used in the first particles, and mother particles charged negatively are used in the second particles.

The average charge amount (fC per particle) is substantially proportional to square of the average particle diameter $2r$ (μm), and the smaller the average particle diameter is, the smaller the average charge amount is. Therefore, the preferred range of the average charge amount varies depending on the particle diameter. The average charge amount of the first particles is preferably from $5\times(r^2\times10^2)$ to $150\times(r^2\times10^2)$ fC per particle, and the average charge amount of the second particles is preferably from $-150\times(r^2\times10^2)$ to $-5\times(r^2\times10^2)$ fC per particle.

Examples of the fine particles attached to the surface of the mother particles include insulating fine particles and electroconductive fine particles.

Examples of the insulating fine particles include inorganic fine particles of a metallic oxide, such as silicon oxide (silica), titanium oxide and alumina. In order to adjust the charging property, the fluidity and the environmental dependency of the fine particles, the fine particles may be subjected to a surface treatment with a coupling agent or a silicone oil. The charging polarity of the insulating fine particles may be the same as or different from that of the mother particles, and in general, fine particles charged positively are used in the first particles, whereas fine particles charged negatively are used in the second particles.

Preferred examples of the insulating fine particles charged positively include those fine particles having been subjected to a treatment with a coupling agent containing a nitrogen atom or a silicone oil containing a nitrogen atom. Examples of the coupling agent include an aminosilane series coupling agent, an aminotitanium series coupling agent and a nitrile series coupling agent, and an amino coupling agent, such as an aminosilane series coupling agent and an aminotitanium series coupling agent, is preferably used.

Examples of the amino coupling agent include aminopropyltrimethoxysilane, aminopropyltriethoxysilane, aminobutyltriethoxysilane, dimethylaminopripyltrimethoxysilane, diethylaminopropyltrimethoxysilane, dipropylaminopropyltrimethoxysilane, dibutylaminopropyltrimethoxysilane, monobutylaminopropyltrimethoxysilane, dioctylaminopropyltrimethoxysilane, dibutylaminopropyldimethoxysilane, dibutylaminopropylmonomethoxysilane, aminophenyltriethoxysilane, dimethylaminophenyltriethoxysilane, trimethoxysilyl-γ-propylphenylamine, trimethoxysilyl-γ-propylbenzylamine, trimethoxysilyl-γ-propylpiperidine, trimethoxysilyl-γ-propylmorpholine, trimethoxysilyl-γ-propylimidazole, γ-aminopropyldimethylmethoxysilane, γ-aminopropylmethyltrimethoxysilane, 4-aminobutyldimethylmethoxysilane, 4-aminobutylmethyldiethoxysilane, N-(2-aminoethyl)-3-aminopropyltriethoxysilane, N-(2-aminoethyl) aminopropyldimethylmethoxysilane, 1,3-bis(3-aminopropyl)-1,1,3,3-tetramethyldisilazane, 1,3-bis(4-aminobutyl)-1,1,3,3-tetramethyldisilazane, 1,3-bis(N-(2-aminoethyl)aminopropyl)-1,1,3,3-tetramethyldisilazane, 1,3-bis(diemthylaminopropyl)-1,1,3,3-tetramethyldisilazane, 1,3-bis(diethylaminopropyl)-1,1,3,3-tetramethyldisilazane, 1,3-bis(3-propylaminopropyl)-1,1,3,3-tetramethyldisilazane, 1,3-bis(3-aminopropyl)-1,1,3,3-tetramethyldisilazane and isopropyltri(N-aminoethylaminoethyl)titanate.

Examples of the silicone oil containing a nitrogen atom include an amino-modified silicone oil, a nitrile-modified silicone oil and an isocyanate series silicone oil. Specific examples of the amino-modified silicone oil include KF857, KF858, KF861, KF864 and KF880 produced by Shin-Etsu Chemical Co., Ltd. and DF8417 produced by Toray Dow Corning Co., Ltd.

The inorganic fine particles having been subjected to a treatment with a coupling agent containing atoms other than a nitrogen atom or a silicone oil containing atoms other than a nitrogen atom are preferred as the insulating fine particles charged negatively. Examples of the coupling agent include a silane series coupling agent, a titanium series coupling agent, an epoxysilane coupling agent and an acrylic silane coupling agent that contain no nitrogen atom (i.e., that are constituted with atoms other than nitrogen).

Examples of the silane series coupling agent containing no nitrogen atom include methyltrichlorosilane, dimethyldichlorosilane, trimethylchlorosilane, phenyltrichlorosilane, diphenyldichlorosilane, tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, isobutyltrimethoxysilane, decyltrimethoxysilane, hexamethyldisilazene, tert-butyldimethylchlorosilane, vinyltrichlorosilane, vinyltrimethoxysilane, vinyltriethoxysilane, γ-methacryloxypropyltrimethoxysilane, γ-mercaptopropyltrimethoxysilane, γ-chloropropyltrimethoxysilane, vinyltris(β- methoxyethoxy)silane, γ-methacryloxypropyltrimethoxysilane and γ-glycidoxypropyltrimethoxysilane.

The titanium series coupling agent containing no nitrogen atom include isopropyltriisostearate titanate, tetrabutoxytitanium, isopropyltris(dioctylpyrophosphate) titanate, tetraoctylbis(ditridecylphosphite) titanate, bis(octylpyrophosphate) oxyacetate titanate, bis(dioctylpyrophosphate)ethylene titanate, isopropyltrioctanoyl titanate, isopropyltrioctanoyl titanate and isopropyldimethacrylisostearoyl titanate.

Examples of the epoxysilane coupling agent containing no nitrogen atom include γ-glycidoxypropylmethyldiethoxysilane, β-(3,4-epoxycyclohexyl)ethyltrimethoxysilane, and γ-glycidoxypropylmethoxysilane.

Examples of the acrylic silane coupling agent containing no nitrogen atom include γ-methacryloxypropyltrimethoxysilane.

Examples of the silicone oil containing no nitrogen atom include a dimethyl silicone oil, an alkyl-modified silicone oil, an α-methylsulfone-modified silicone oil, a methylphenyl silicone oil, a chlorophenyl silicone oil and a fluorine-modified silicone oil.

In the case where the inorganic fine particles are subjected to a surface treatment with a coupling agent or a silicone oil, a dry treatment, in which the inorganic fine particles are made into a cloud state by agitation, and the coupling agent or the silicone oil having been vaporized is reacted therewith, and a wet treatment, in which the coupling agent or the silicone oil having been dispersed in a solvent is dropped on the fine particles, may be employed. In the case of the titanium compound, such a method can also be employed, in which a silane compound is dropped on and mixed with $TiO(OH)_2$ having been dispersed in water.

The amount of the coupling agent or the silicone oil based on the inorganic fine particles is generally from 1 to 250 parts by weight, and preferably from 50 to 200 parts by weight, per 100 parts by weight of the inorganic fine particles, while depending on the desire electric characteristics of the insulating fine particles.

Among these inorganic fine particles having been treated with the coupling agent, a titanium compound obtained by the reaction between $TiO(OH)_2$ and a silane compound, such as a silane coupling agent, disclosed in Japanese Patent Laid-Open No. 3177/1998 is preferred. Usable examples of the silane compound include any type of chlorosilane, alkoxysilane, silazane and a special silylating agent. The titanium compound is produced by reacting $TiO(OH)_2$ formed through the wet process with the silane compound or the silicone oil, followed by drying. The fine particles are not aggregated and are substantially in a state of primary particles because they do not suffer a baking process at several hundreds degree, and a firm bond between Ti atoms is not formed. Furthermore, because the silane compound or the silicone oil is directly reacted with $TiO(OH)_2$, the treating amount of the silane compound or the silicone oil can be large, whereby the charge characteristics can be controlled by adjusting the treating amount of the silane compound, and the charging ability that can be imparted can be remarkably improved in comparison to titanium oxide conventionally employed. The treating amount is generally from 1 to 250 parts by weight, and preferably from 50 to 200 parts by weight, per 100 parts by weight of the $TiO(OH)_2$. A complex treatment of the titanium fine particles may be conducted by using other compounds after drying.

The insulating fine particles are preferably white or transparent to avoid influence on the color of the mother particles.

The mixing ratio of the insulating fine particles and the mother particles is appropriately adjusted depending on the particle diameter of the mother particles and the particle diameter of the insulating fine particles. When the addition amount of the insulating fine particles is too large, a part of the fine particles is released from the surface of the mother particles to attach the surface of the mother particles of the other particles, whereby the desired charge characteristics cannot be obtained. The amount of the insulating fine particles is generally from 0.01 to 3 parts by weight, and more preferably from 0.05 to 1 part by weight, per 100 parts by weight of the mother particles.

The fine particles preferably have such an appropriate resistance that the charge of the particles is not excessively leaked, and increase of the charge of the particles can be avoided. Preferred range of the resistance is about from $10^3$ to $10^{14}$ Ω·cm, and more preferably about from $10^8$ to $10^{12}$ Ω·cm, while depending on the compositions and the shapes of the mother particles and the fine particles and the attached amount of the fine particles to the mother particles. The resistance of the insulating fine particles can be adjusted to fall within the range by controlling the species and the amount of the coupling agent or the silicone oil used, or in alternative, a mixture of the insulating fine particles and the electroconductive fine particles may have a resistance within the range.

Examples of the electroconductive fine particles include electroconductive titanium oxide, an electroconductive mixture of indium and titania, carbon black, fine particles of tin oxide doped with antimony oxide (T-1, a trade name, produced by Mitsubishi Materials Corp.) and titanium oxide/tin oxide doped with antimony oxide (W-P, a trade name, produced by Mitsubishi Materials Corp.).

The addition amount of the electroconductive fine particles is preferably from 0.001 to 0.01 part by weight per 100 parts by weight of the mother particles. When the addition amount of the electroconductive fine particles is too large, decrease in the charge amount occurs upon repeated use, whereby the first and second particles are difficult to be separated upon application of an electric field, and they cannot sufficiently migrate.

The primary particles of the insulating particles and the electroconductive particles generally have a diameter of from 5 to 100 nm, and preferably from 10 to 50 nm, while not limited.

As the method for fixing the fine particles on the surface of the mother particles, a fixing method of the fine particles by a wet process can be employed, in which, for example, the fine particles are added to the mother particles that is in the stage where the mother particles are produced by a wet process, such as suspension polymerization, followed by agitation and mixing, so as to fix by adsorption the fine particles on the surface of the mother particles, and then the first and second particles are taken out through drying. In order to firmly fix the fine particles on the surface of the mother particles, it is preferred to use a heat treatment or a high speed airflow impact treatment.

The heat treatment is conducted simultaneously with the mixing and agitation of the fine particles and the mother particles, and a known method can be employed, in which the mother particles and the fine particles are agitated in a mixer having a heater jacket or a mixer having a jacket, through which a hot water or steam is passed, and the mother particles and the fine particles are transported into a heated airflow. The temperature of the treatment is preferably a temperature above the glass transition point or the softening point of the resin constituting the mother particles.

In the high speed airflow impact treatment, such a method can be employed that the prescribed amounts of the mother particles and the fine particles are mixed, and the resulting mixture is introduced into an airflow circulating at a high speed, whereby the mother particles and the fine particles are dispersed and made to collide on a blade rotating at a high speed or a side wall, so as to fix the fine particles on the surface of the mother particles by an impact force thus formed. In this method, the state of fixing varies depending on the shape and the size of the fine particles. There are cases where heat is generated by the large impact force, and in the case where the atmospheric temperature of the airflow exceeds the glass transition temperature of the resin constituting the mother particles, fixing by heating and implantation by impact simultaneously occur to firmly fix the fine particles to the mother particles.

The average charge amount of the first particles is preferably from $5\times(r^2/10^2)$ to $150\times(r^2/10^2)$ fC per particle, and more preferably from $10\times(r^2/10^2)$ to $100\times(r^2/10^2)$ fC per particle, in which the average particle diameter thereof is expressed by $2r$ ($\mu$m). The average charge amount of the second particles is preferably from $-5\times(r^2/10^2)$ to $-150\times(r^2/10^2)$ fC per particle, and more preferably from $-10\times(r^2/10^2)$ to $-100\times(r^2/10^2)$ fC per particle. The absolute value of the difference between the average charge amounts of the first particles and the second particles is preferably from 0 to 20 fC per particle, and more preferably from 0 to 10 fC per particle.

The contrast depends on the particle diameters of the first and second particles as described in the foregoing, and also depends on the mixing ratio of the first and second particles. In order to obtain high contrast, it is desirable that the mixing ratio is determined to make the surface areas of the first and second particles be substantially the same as each other. When the mixing ratio largely deviates from that ratio, the color of the particle of the large proportion is emphasized. However, in the case where the color tones of the two kinds of particles are a dark tone and a light tone of the similar color, and the case where a color formed by mixing the two kinds of particles is used for making an image, the foregoing conditions may not be applied.

The image display medium of the invention described in the foregoing can be used as a bulletin board, a notice board for circulation, an electronic blackboard, an advertisement, a signboard, a blinking sign, electronic paper, electronic newspaper, an electronic book and a document sheet usable on both a duplicator and a printer, all of which can conduct storage and rewriting of an image.

The invention will be described in more detail with reference to the following example. All the parts are parts by weight unless otherwise indicated.

EXAMPLE 1

Preparation of First Particles
Preparation of Fine Particles 100 parts of silica fine particles (A-130, produced by Nippon Aerosil Co., Ltd.) are put in a mixer, to which a solution of 50 parts of aminopropyltrimethoxysilane and 50 parts of methanol is sprayed thereon under stirring. The resulting fine particles are dried and pulverized for 2 minutes by using a sample mill, so as to obtain fine particles having an average primary particle diameter of 130 nm and a resistance (at 25° C.) of $2\times10^9$ Ω·cm.

Preparation of Mother Particles 10 parts of carbon black, 50 parts of methyl methacrylate and 10 parts of disodium lauryl sulfosuccinic acid are subjected to a dispersion treatment in a ball mill for 10 hours to prepare a carbon black dispersion. A liquid A containing 80 parts of the resulting carbon black dispersion, 10 parts of methyl methacrylate, 10 parts of ethylene glycol dimethacrylate and 0.2 part of 2,2-azobis-2,4-dimethylvaleronitrile is sufficiently stirred and mixed, and a liquid B containing 10 parts of polyvinyl alcohol and 500 parts of water is stirred and mixed. The liquid B is then added to the liquid A while the droplet of the liquid B has a diameter of 20 $\mu$m. Thereafter, the mixed solution are sufficiently deaerated under a nitrogen atmosphere and subjected to polymerization by heating the mixed solution to 65° C. for 7 hours. After cooling the mixed solution to room temperature, the product thus formed is separated by suction filtration and washed with warm water and then with methanol, followed by drying. Thereafter, coarse particles and fine particles are removed by a wind force classifying apparatus, so as to obtain black spherical particles having an average particle diameter of 20 $\mu$m with a standard deviation of 5 $\mu$m.

Mixing of Mother Particles and Fine Particles 0.2 part of the silica fine particles having been subjected to the surface treatment are added to 100 parts of the spherical particles thus prepared, and the resulting mixture is agitated for 90 seconds in a sample mill, so as to obtain the black first particles.

Preparation of Second Particles
Preparation of Fine Particles

Ilumenite is dissolved in sulfuric acid, from which an iron content is removed, and water is added to the resulting $TiOSO_4$ to form $TiO(OH)_2$. To 100 parts of $TiO(OH)_2$ thus prepared dispersed in 500 cm$^3$ of water, 50 parts of isobutyltrimethoxysilane is added dropwise. The fine particles in the mixed solution thus obtained are filtered and subjected to repeated washing with water. The resulting titanium compound having been subjected to the surface treatment with isobutyltrimethoxysilane is dried at 150° C. and pulverized in a sample mill for 2 minutes, so as to obtain fine particles having an average primary particle diameter of 30 nm and a volume resistivity (25° C.) on application of a voltage of 1,000 V/cm of $2\times10^{10}$ Ω·cm.

Preparation of Mother Particles

Mother particles (spherical particles) having a volume average particle diameter of 20 $\mu$m are obtained in the same manner as in the preparation of the mother particles of the first particles except that a titanium oxide dispersion is prepared by using 40 parts of titanium oxide (average particle diameter: 0.3 $\mu$m) instead of carbon black.

Mixing of Mother Particles and Fine Particles 0.1 part of the fine particles of the titanium compound having been subjected to the surface treatment are added to 100 parts of the mother particles thus prepared, and the resulting mixture is agitated for 120 seconds in a sample mill, so as to obtain the white second particles.

Mixing of First and Second Particles 10 parts of the resulting black particles and 20 parts of the resulting which particles are placed in a vessel and agitated in a tumbler mixer for 3 minutes.

Preparation of Image Display Medium

First and second substrates each is obtained in such a manner that a transparent ITO electrode is formed on a 7059 glass support base having a dimension of 50 mm×50 mm×1.1 mm, and a polycarbonate resin (PC-Z, produced by Mitsubishi Gas Chemical Co., Inc.) layer having a thickness of 5 $\mu$m is formed thereon. A silicone rubber plate having a dimension of 40 mm×40 mm×0.3 mm is cut to remove a square of 15 mm and 15 mm from the center part thereof to prepare a spacer, which is then put on the second substrate. 15 mg of the resulting mixed particles are then dropped through a screen into the square space formed by cutting the center part of the silicone rubber plate. Thereafter, the first substrate is adhered on the spacer, and the both substrates are clumped with an alligator clip to make the silicone rubber plate and the substrates in close contact with each other, whereby an image display medium is prepared.

Evaluation

When a direct current voltage of 150 V is applied to the whole surface of the transparent electrode of the first substrate of the image display medium, a part of the white particles charged negatively present on the side of the second substrate start to migrate toward the first substrate by the action of an electric field, and when a direct current voltage of 500 V is applied, a large amount of the white particles migrate toward the first substrate, and the display density is substantially saturated. At this time, the black particles charged positively migrate toward the second substrate. Thereafter, even when the voltage is made 0 V, the particles on the display substrate do not migrate to cause no change on the display density. The density of the black image on the second substrate is 1.50, and the density of the white image on the first substrate is 0.32, both of which have no image unevenness and provide high contrast.

The average charge amount of the white particles is −10 fC per particle, and the average charge amount of the black particles is +20 fC per particle. The measurement of the charge amount distribution is conducted by a charge spectrograph method.

Figure 2:
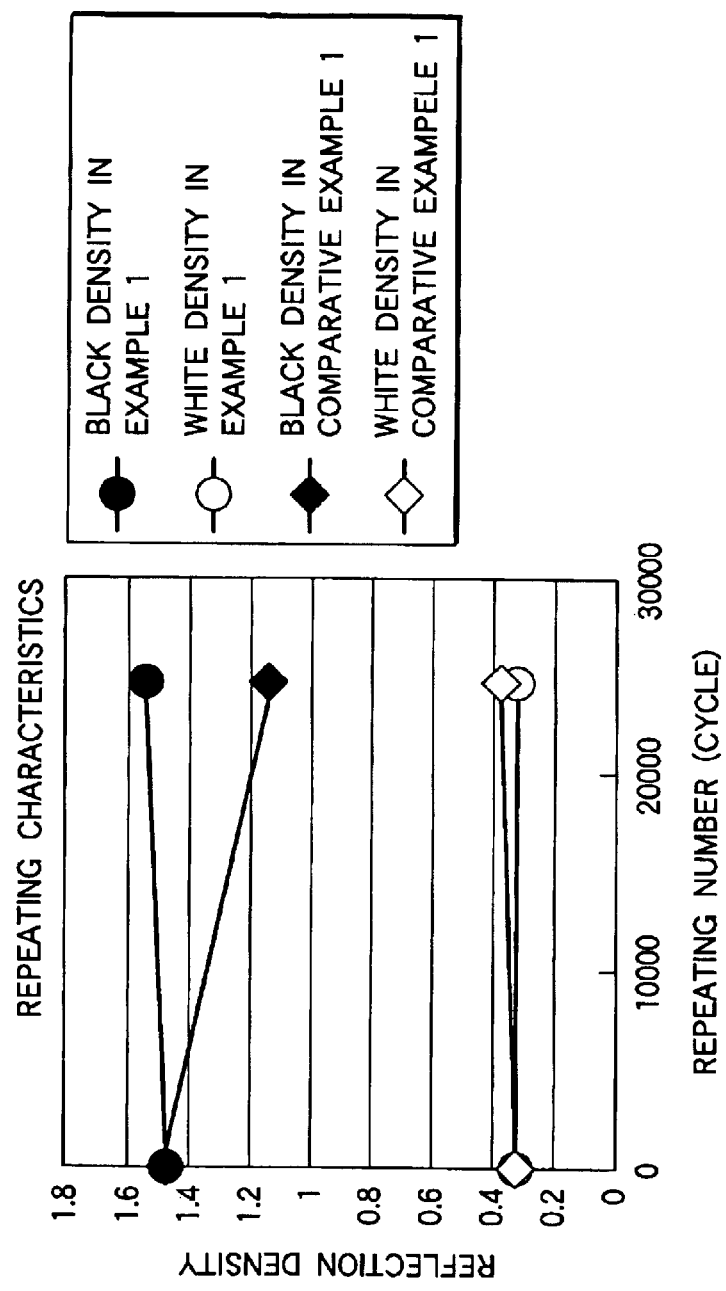
FIG. 2 is a graph showing the relationship between the repeating number of switching of voltage and the reflection density.
Figure 3:
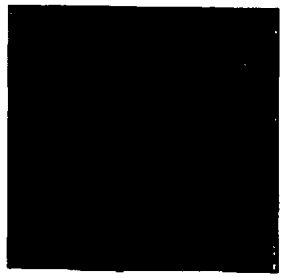
FIG. 3 is a diagram showing a state of an image display medium of Example 1 displaying black color on the whole surface thereof after the applied voltage is switched by 25,000 cycles.
Figure 4:
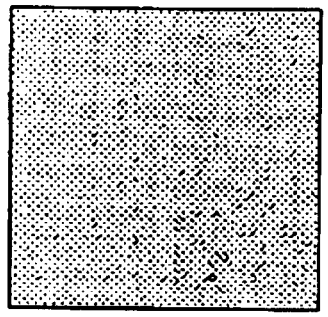
FIG. 4 is a diagram showing a state of an image display medium of Example 1 displaying white color on the whole surface thereof after the applied voltage is switched by 25,000 cycles.

The applied voltage is switched between −500 V and 500 V, and switching is repeated for 1,600 cycles with an interval of 1 second, and for 25,000 cycles with an interval of 0.1 second. After 25,000 cycles of switching, the density of the black image on one substrate is 1.55, and the density of the white image on the other substrate is 0.31 (see FIG. 2), so as to cause no decrease in contrast. Furthermore, no unevenness in image density is observed (see FIGS. 3 and 4). The change of the charge amount before and after the 25,000 cycles of switching is small (see FIG. 7).

COMPARATIVE EXAMPLE 1

Figure 5:
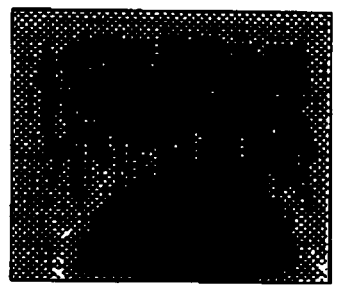
FIG. 5 is a diagram showing a state of an image display medium of Comparative Example 1 displaying black color on the whole surface thereof after the applied voltage is switched by 25,000 cycles.
Figure 6:
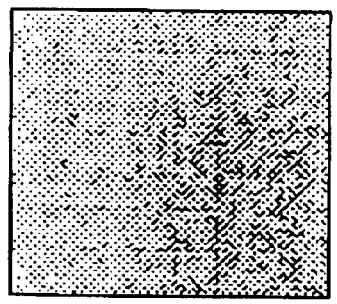
FIG. 6 is a diagram showing a state of an image display medium of Comparative Example 1 displaying white color on the whole surface thereof after the applied voltage is switched by 25,000 cycles.

An image display medium is produced and evaluated in the same manner as in Example 1 except that the silica fine particles having been subjected to the surface treatment are not added in the preparation of the first particles. The density of the black image in the initial stage formed on one substrate is 1.50, and the density of the white image in the initial stage on the other substrate is 0.34. The average charge amount of the white particles is −18 fC per particle, and the average charge amount of the black particles is +48 fC per particle. After conducting 25,000 cycles of switching of the applied voltage, the density of the white image 0.38, which is not largely changed (see FIGS. 2 and 6), but the average density of the black image is decreased to 1.15 (see FIG. 2), with image unevenness caused (FIG. 5). While the change of the average charge amount before and after the 25,000 cycles of switching is small, the distribution of the charge amount is broadened after the switching.

EXAMPLE 2

Preparation of Fine Particles of First Particles 100 parts of silica fine particles (A-130, produced by Nippon Aerosil Co., Ltd.) are put in a mixer, to which a solution of 15 parts of an amino-modified silicone oil KF859 (produced by Shin-Etsu Chemical Co., Ltd.) dissolved in 1,000 parts of toluene is sprayed thereon under stirring. The resulting fine particles are heated to a temperature of 250° C. and stirred to remove the solvent, and they are pulverized for 2 minutes by using a sample mill, so as to obtain fine particles having an average primary particle diameter of 150 nm and a resistance (at 25° C.) of $5 \times 10^{10}$ Ω·cm.

Preparation of Fine Particles of Second Particles 100 parts of silica fine particles (A-130, produced by Nippon Aerosil Co., Ltd.) are put in a mixer, to which a solution of 15 parts of a dimethylsilicone oil KF96H (produced by Shin-Etsu Chemical Co., Ltd.) dissolved in 1,000 parts of toluene is sprayed thereon under stirring. The resulting fine particles are heated to a temperature of 250° C. and stirred to remove the solvent, and they are pulverized for 2 minutes by using a sample mill, so as to obtain fine particles having an average primary particle diameter of 150 nm and a resistance (at 25° C.) of $1 \times 10^{13}$ Ω·cm.

Preparation and Evaluation of Image Display Medium

An image display medium is produced in the same manner as in Example 1 except that the fine particles obtained in the foregoing are used as the fine particles of the first and second particles. The density of the black image in the initial stage on one substrate is 1.55, and the density of the white image in the initial stage on the other substrate is 0.36. Evan after 25,000 cycles of the switching of voltage, the densities do not suffer large change, and no image unevenness is observed.

EXAMPLE 3

An image display medium is prepared and evaluated in the same manner as in Example 1 except that 0.005 part of electroconductive titanium oxide fine particles ( ) are further used in the preparation of the first particles. As a result, no large change occurs in the charge characteristics and the image densities before and after the 25,000 cycles of switching, and no image unevenness is observed.

EXAMPLE 4

In the preparation of the first particles, 0.3 part of the silica fine particles having been subjected to a treatment of aminopropyltrimethoxysilane used in Example 1 and 100 parts of carbon-containing polymethyl methacrylate black spherical mother particles having a volume average particle diameter of 20 μm are mixed and put in a mixer having a heater jacket, and the mixture is agitated under heating to 150° C., followed by cooling to room temperature, so as to obtain black spherical first particles having the fine particles attached and fixed on the surface of the mother particles. Similarly, 0.15 part of the titania fine particles having been treated with isobutyltrimethoxysilane used in Example 1 and 100 parts of titanium oxide-containing polymethyl methacrylate having a volume average particle diameter of 20 μm are mixed and put in a mixer having a heater jacket, and the mixture is agitated under heating to 100° C., followed by cooling to room temperature, so as to obtain white spherical second particles having the fine particles attached and fixed on the surface of the mother particles. An image display medium is prepared and evaluated in the same manner as in Example 1 except that the first particles and the second particles thus obtained herein are used. Even after 50,000 cycles of the switching of voltage, sufficient contrast can be obtained, and no image unevenness is observed.

EXAMPLE 5

Preparation of First Particles
Preparation of Fine Particles

The fine particles of the first particles are prepared in the same manner as in Example 1 except that 50 parts of N-(2-aminoethyl)aminopropyltriethoxysilane is used instead of 50 parts of aminopropyltrimethoxysilane.

Mixing of Mother Particles and Fine Particles 0.3 part of the silica fine particles thus obtained and 100 parts of the black spherical mother particles of carbon-containing polymethyl methacrylate having a volume average particle diameter of 20 μm used in Example 1 are mixed and put in a high speed airflow impact treating apparatus (produced by Nara Machinery Co., Ltd.). A treatment is conducted at a rotational speed of the rotor of 10,000 rpm and a treating time of 2 minutes, followed by discharging and standing to cool, so as to obtain black spherical first particles having the fine particles attached and fixed on the surface of the mother particles.

Preparation of Second Particles
Preparation of Fine Particles

Fine particles of the second particles are prepared in the same manner as in Example 1 except that 50 parts of decyltrimethoxysilane is used instead of 50 parts of isobutyltrimthoxysilane.

Mixing of Mother Particles and Fine Particles

The white spherical second particles having the fine particles attached and fixed on the surface of the mother particles are obtained in the same manner as in Example 1 except that 0.2 part of the titania fine particles obtained in the foregoing and 100 parts of the titanium oxide-containing polymethyl methacrylate particles having a volume average particle diameter of 20 μm are used.

Preparation and Evaluation of Image Display Medium

An image display medium is prepared and evaluated in the same manner as in Example 1 except that the first and second particles thus obtained herein are used. Even after 50,000 cycles of the switching of voltage, sufficient contrast can be obtained, and no image unevenness is observed.

The results obtained in Examples 1 to 5 and Comparative Example 1 are summarized in Table 1 below.

TABLE 1

| | Fine particles of first particles | | Fine particles of second particles | | | Charge amount in initial stage (fC per particle) | | After 25,000 cycles of switching | | |
|---|---|---|---|---|---|---|---|---|---|---|
| | Material | Resistance (Ω · cm) | Material | Resistance (Ω · cm) | Mixing method | First particles | Second particles | Black image density | White image density | Image unevenness |
| Example 1 | silica treated with aminopropyltrimethoxysilane | $2 \times 10^9$ | titanium treated with isobutyltrimethoxysilane | $2 \times 10^{10}$ | agitation | 20 | −10 | 1.55 | 0.31 | none |
| Comparative Example 1 | none | | titanium treated with isobutyltrimethoxysilane | $2 \times 10^{10}$ | agitation | 48 | −18 | 1.15 | 0.38 | found |
| Example 2 | silica treated with amino-modified silicone oil | $5 \times 10^{10}$ | silica treated with dimethylsilicone oil | $1 \times 10^{13}$ | agitation | 10 | −25 | 1.50 | 0.35 | none |
| Example 3 | silica treated with aminopropyltrimethoxysilane and electroconductive titanium oxide | $3 \times 10^8$ | titanium treated with isobutyltrimethoxysilane | $2 \times 10^{10}$ | agitation | 16 | −10 | 1.48 | 0.34 | none |
| Example 4 | silica treated with aminopropyltrimethoxysilane | $2 \times 10^9$ | titanium treated with isobutyltrimethoxysilane | $2 \times 10^{10}$ | heat treatment | 16 | −9 | 1.51 | 0.33 | none |
| Example 5 | silica treated with N-(2-aminoethyl)aminopropyl-triethyoxysilane | $3 \times 10^{12}$ | titanium treated with decyltrimethoxysilane | $3 \times 10^{13}$ | high speed airflow impact treatment | 30 | −25 | 1.57 | 0.37 | none |

As described in the foregoing, according to the invention, such an effect is obtained that the change of the displayed image density is small, image unevenness does not easily to occur, and high contrast can be maintained even after repeated use for a long period of time.

The entire disclosure of Japanese Patent Application No. 2000-263953 filed on Aug. 31, 2000 including specification, claims, drawings and abstract is incorporated herein by reference in its entirety.

What is claimed is:

1. An image display medium, comprising
   a first substrate transmitting light;
   a second substrate provided to face the first substrate;
   first and second particles having different colors filled between the first substrate and the second substrate in other than a liquid medium;
   the first and second particles each containing mother particles and fine particles attached on a surface of the mother particles;
   the first particles being charged positively;
   the second particles being charged negatively;
   at least some of the fine particles of the first particles having been subjected to treatment with at least one of a coupling agent containing a nitrogen atom or a silicone oil containing a nitrogen atom; and
   at least some of the fine particles of the second particles having been subjected to treatment with at least one of a coupling agent containing atoms other than a nitrogen atom or a silicone oil containing atoms other than a nitrogen atom.

2. The image display medium as claimed in claim 1, wherein the mother particles of the first particles are charged positively, and the mother particles of the second particles are charged negatively.

3. The image display medium as claimed in claim 1, at least one of 1) at least some of the fine particles of the first particles and 2) at least some of the fine particles of the second particles are electroconductive fine particles.

4. The image display medium as claimed in claim 1, wherein at least one of the fine particles of the first particles and the fine particles of the second particles are fixed on a surface of the mother particles by heat treatment.

5. The image display medium as claimed in claim 1, wherein at least one of the fine particles of the first particles and the fine particles of the second particles are fixed on a surface of the mother particles by high speed airflow impact treatment.

6. The image display medium as claimed in claim 1, wherein the coupling agent comprises at least one of an aminosilane series coupling agent, an aminotitanium series coupling agent and a nitrile series coupling agent.

7. The image display medium as claimed in claim 1, wherein the silicone oil comprises at least one of an amino-modified silicone oil, a nitrile-modified silicone oil and an isocyanate series silicone oil.

8. The image display medium as claimed in claim 3 wherein the electroconductive fine particles comprise at least one of electroconductive titanium oxide, an electroconductive mixture of indium and titanium, carbon black, tin oxide doped with antimony oxide, and titanium oxide/tin oxide doped with antimony oxide.

9. The image display medium as claimed in claim 3, wherein the electroconductive fine particles comprise greater than 0.001 part weight per 100 parts weight of the mother particles.

10. The image display medium as claimed in claim 3, wherein the electroconductive fine particles comprise less than 0.01 part weight per 100 parts weight of the mother particles.

11. The image display medium as claimed in claim 10, wherein the electroconductive fine particles comprise greater than 0.001 part weight per 100 parts weight of the mother particles.

12. The image display medium as claimed in claim 1, wherein the other than liquid medium is a gaseous medium.

* * * * *